United States Patent [19]

Morlec et al.

[11] Patent Number: 5,820,836
[45] Date of Patent: Oct. 13, 1998

[54] ROTATING CATALYTIC CLEANING DEVICE FOR POLLUTED EFFLUENTS

[75] Inventors: Jean Morlec, Saint-Nazaire; Jacques Bourcier, 4? rue de l'Etoile du Matin, 44600 Saint-Nazaire, both of France

[73] Assignees: Institute Francais du Petrole, Rueil-Malmaison; Jacques Bourcier, Saint-Nazaire, both of France

[21] Appl. No.: 700,511
[22] PCT Filed: Dec. 18, 1995
[86] PCT No.: PCT/FR95/01692
§ 371 Date: Jan. 3, 1997
§ 102(e) Date: Jan. 3, 1997
[87] PCT Pub. No.: WO96/20039
PCT Pub. Date: Jul. 4, 1996

[30] Foreign Application Priority Data

Dec. 26, 1994 [FR] France ................................ 94 15740

[51] Int. Cl.⁶ .................................. B01J 8/00; F01J 3/10
[52] U.S. Cl. ..................... 423/210; 423/245.3; 422/171; 422/173; 422/175; 422/177; 422/181; 422/209; 110/235; 110/236; 165/5; 165/6; 165/8; 165/9; 165/10; 432/180
[58] Field of Search ..................................... 422/173, 175, 422/171, 177, 198, 211, 209, 206, 181; 165/5, 6, 8, 10, 9; 110/235–236; 431/517; 432/180; 423/212 R, 210, 245.3

[56] References Cited

U.S. PATENT DOCUMENTS

| | | | |
|---|---|---|---|
| 3,870,474 | 3/1975 | Houston | 422/171 |
| 4,310,046 | 1/1982 | Michalak | 165/8 |
| 4,699,206 | 10/1987 | Kirchmeier | 165/8 |
| 5,362,449 | 11/1994 | Hedenhag | 422/173 |
| 5,643,538 | 7/1997 | Morlec et al. | 422/173 |

FOREIGN PATENT DOCUMENTS

| | | |
|---|---|---|
| 365262 | 4/1990 | European Pat. Off. |
| 9311857 | 6/1993 | WIPO |
| 9423246 | 10/1994 | WIPO |

*Primary Examiner*—Hien Tran
*Attorney, Agent, or Firm*—Antonelli, Terry, Stout & Kraus, LLP

[57] ABSTRACT

A process of cleaning a gas and a rotating catalytic gas cleaning device including a crown of vertical axis driven into rotation in a cage. The crown has an annular catalyst bed covering its inner wall and an annular thermal load, outside the catalytic bed, made of a material exhibiting a large heat exchange surface. A polluted gas is radially passed from a peripheral inlet to a central zone of the crown with crossing of an annular thermal load and a catalytic layer. The gas is radially passed gas from the central zone to a peripheral outlet, while again crossing the catalytic bed and thermal load with thermal exchange.

13 Claims, 2 Drawing Sheets

ROTATING CATALYTIC CLEANING DEVICE FOR POLLUTED EFFLUENTS

The invention relates to an improved rotating transfer device for gaseous effluents, suited for working as a heat exchanger and as a thermal and/or catalytic effect cleaner.

The invention notably applies to heat exchange systems or to systems suited for cleaning air loaded with substances such as volatile organic compounds (VOC), that can be oxidized and eliminated by thermal or catalytic incineration.

The claimant's patent application Ser. No. 94/06,282 describes a heat exchange and thermal and/or catalytic effect cleaning device for polluted gases such as VOCs. It comprises a housing or cage, a crown containing a load of solid particulate materials selected because they exhibit a large heat exchange surface (silica, granite or lighter materials such as metallic honeycomb structures or others, or cryogenic nodules for negative temperatures, etc) that is placed in the depth of the cage. The crown is split up into several parts by an inner separation or, in some cases, it serves as a support for a certain number of baskets. Motive means are used for driving the crown and the cage into a rotating motion in relation to one another about a vertical axis (either the crown rotates, the cage being stationary, or the crown is stationary and the cage rotates about it).

The prior device comprises a pipe for delivering effluents into the cage and a pipe for discharging effluents out of the cage. The crown comprises a first sector for communicating continually the delivery pipe with the central part of the cage where a first heat exchange occurs between the effluents and the load in the crown. By means of a second sector of the crown where a second heat exchange takes place between effluents and the load in the crown, the central part of the cage communicates continually with the discharge pipe.

This prior device can be used only as a simple heat exchanger or for a combined use as a heat exchanger and as an incinerator for polluted effluents. In this case, the delivery pipe receives effluents containing polluting substances. The first sector and the second sector communicate directly with one another by means of the central part of the cage. A thermal reactor possibly provided with a catalytic bed selected to bring about an exothermic reaction in the presence of the polluting substances is placed in this central part in order to burn the polluting substances in the effluents channelled by the first angular sector.

With this layout, the crown rotates between two stationary parts: the central reactor and the housing. In order to prevent leaks due to the bypassing of the central zone reactor, it is necessary to provide a double annular seal. This is obtained by imposing tight shape and concentricity tolerances during the manufacturing stage as well as during the mounting stage.

The rotating catalytic cleaning device for polluted gaseous effluents according to the invention comprises a housing or cage, a crown placed in the cage, and motive means for driving the crown into a continuous rotating motion with respect to the cage about a vertical axis, at least one pipe for delivering effluents into the cage and at least one pipe for discharging effluents out of the cage, the crown comprising at least a first sector for communicating continually the delivery pipe with the central part of the cage, and at least a second sector for communicating continually the central part of the cage with the discharge circuits and a catalytic cleaning reactor for burning the polluting substances mixed with the effluents channelled by the first angular sector.

The device is characterized in that it comprises in combination at least an annular catalytic bed arranged in the inner part of the crown over the total circumference thereof and a load of a material exhibiting a large heat exchange surface arranged in the crown, outside the catalytic bed.

With this layout, the polluted effluents (possibly preheated in an outer exchanger), after heating up in contact with the thermal mass in the outer part of the first angular sector of the crown, are cleaned by crossing a first time the annular catalytic bed covering the inner wall of the crown. They cross the bed a second time on the other side of the central part, before they yield part of the heat acquired by means of the catalytic incineration to the thermal mass in the second angular sector of the crown prior to their discharge.

This layout of the mass having a large heat exchange surface and of the catalyst in the rotating part of the device allows the weight and the volume of the crown to be decreased, which simplifies its design. It also facilitates its assembly and lowers manufacturing and maintenance costs.

The crown being within the cage, two bearings are sufficient to support its shaft and to bear the stresses. Insulating joints or flap joints (12) are arranged between the cage (2) and the crown (1). To drive it into rotation, outer motive means sufficiently distant from the warmest zones can be used and installed on top of the device, which allows its headroom to be decreased.

The thickness of the catalytic bed is selected sufficient for the polluted gases to be cleaned after their two successive passages through the catalytic bed, on either side of the central part.

The thermal reactor preferably comprises heating means communicating with the central zone of the crown, such as a burner arranged in a fresh effluent delivery pipe opening into the central zone of the crown or a burner placed outside the crown, above its central zone, and preferably associated in this case with means for injecting a flow of temperature regulating fresh gas into an intermediate zone between the inflow and the outflow zones.

With this combination of effluent cooling and heating means, the incineration temperature can be easily regulated when it varies on account of the variation in the proportion of polluting substances in the effluents.

This addition of a burner is most often necessary for starting if the polluted gases delivered are not warm enough or if the VOC proportion in the gases is not sufficient for the self-sustainment of the exothermic reaction in the reactor.

According to an embodiment, the crown is eccentric in the cage, the latter delimiting around the crown two peripheral zones of variable section, and two intermediate zones of high pressure drop so as to prevent parasitic flows from bypassing the thermal reactor, and insulating joints can be provided between the cage and the crown.

According to an embodiment, the crown is split up into several angular zones by an inner separation (8), each of these zones being filled, outside the catalytic bed, with a bulk load of a material having a large heat exchange surface. The crown can also comprise a plurality of parallelepipedic chambers 10 containing the load exhibiting a large heat exchange surface.

This load exhibiting a large heat exchange surface consists for example of knitted, woven or needled metallic mats, stone blocks, a honeycomb structure or it is made from turning or machining chips.

The crown and the cage comprise each an upper end part and a lower end part, and preferably seal means arranged between the corresponding walls, such as blade joints or flap joints. The upper and lower seal is easy to provide because the temperature is relatively low therein.

The device can also comprise means for injecting a flow of sweep gas into an intermediate zone between the inflow and the outflow zones.

The continuous cleaning process according to the invention is characterized in that it comprises establishing a permanent circulation of effluents to be cleaned on one hand between delivery pipes and on the other hand discharge pipes through a rotating crown provided with an inner separation and containing at least an annular catalytic bed arranged against its inner wall and a load of a material exhibiting a large heat exchange surface arranged in the crown outside the catalytic bed, so that the effluents flow through the rotating load and heat up in contact therewith in a first heat exchange zone and, after a double passage through the rotating catalytic bed and incineration, in that they heat the thermal mass in a second heat exchange zone.

With the process according to the invention, the polluting substances can be incinerated at a temperature of the order of 400° to 500° C. only, which simplifies the design and reduces technical constraints, as well as the manufacturing cost.

BRIEF DESCRIPTION OF THE DRAWINGS

Other features and advantages of the improved device according to the invention will be clear from reading the description hereafter given by way of non limiting example, with reference to the accompanying drawings in which.

Figure 1:
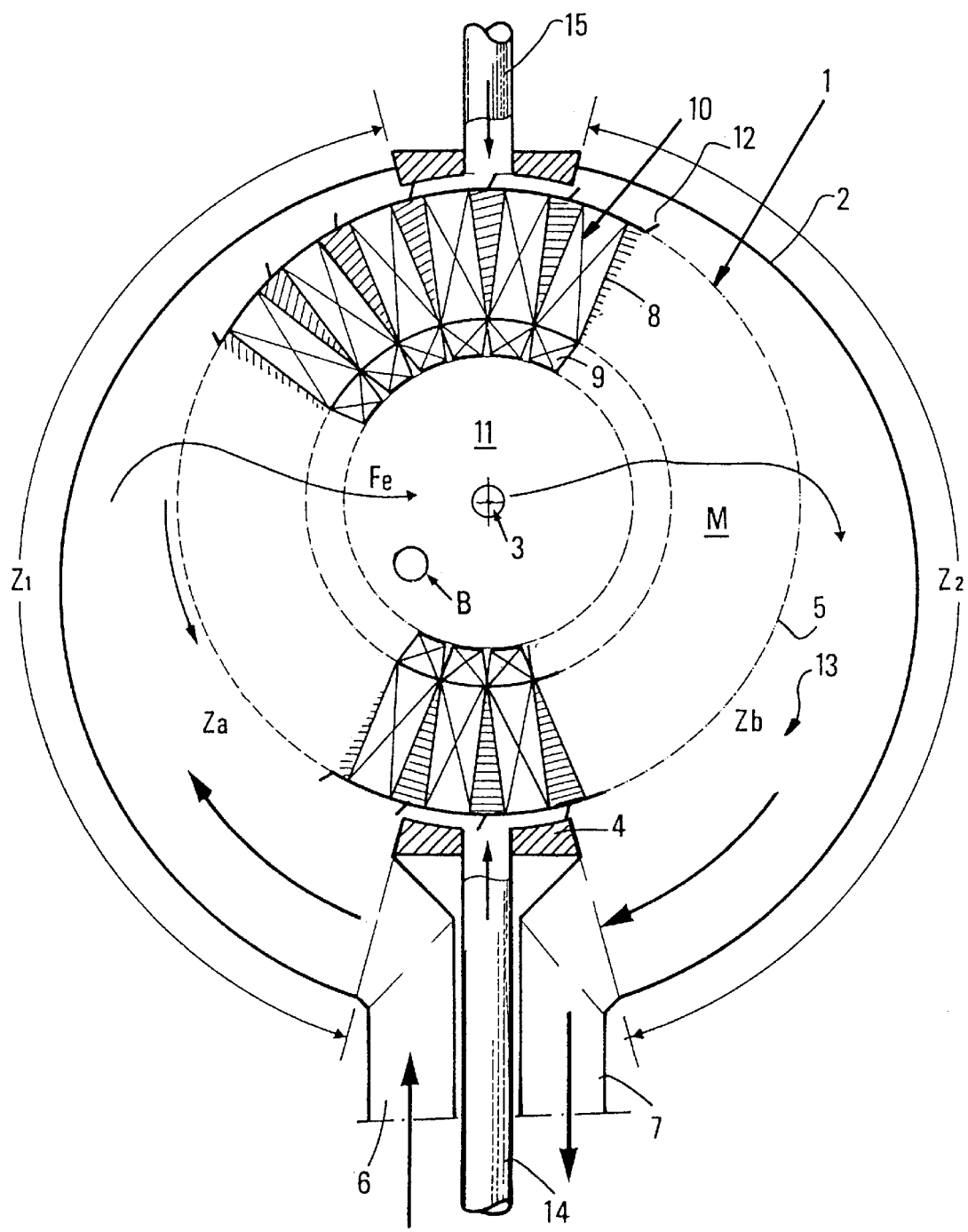
FIG. 1 diagrammatically shows a cross-section of an embodiment of the device, in a combined use as an incinerator for polluting substances in effluents and as a heat exchanger.

The device comprises (FIG. 1) a drum consisting of a crown (1) of vertical axis arranged in a metallic outer housing or cage 2 of cylindrical shape for example. The diameter of the cage or housing 2 is greater than that of crown 1. The latter is offset with respect to cage 2. On either side of the diametral plane containing the vertical axis 3 of the crown, and along a limited angular sector, cage 2 comprises a portion of a lateral wall 4 substantially tangent to the lateral wall 5 of the crown. The inner space of the cage around crown 1, on either side of wall portion 4, thus comprises two rounded zones of variable section Za and Zb. They communicate respectively with a pipe 6 intended to deliver the gaseous effluents to be cleaned and with a pipe 7 intended to discharge these effluents after cleaning.

Crown 1 is provided with an inner separation consisting of evenly distributed straight radial plates 8. A first angular sector Z1 delimited by one or several of these radial plates 8 channels the effluents to be cleaned and fed into the convergent zone Za towards the central zone 11 of the crown (flow Fe). A second angular sector Z2 communicates the central zone 11 of the crown with the divergent zone Zb and with discharge pipe 7 (flow Fs).

The inner wall of the crown is entirely covered with an annular catalytic bed 9 that the effluents must cross to reach the reactive central zone 11. This catalytic bed 9 consists either of a particle bed, or preferably of a honeycomb catalyst, which allows, all other things being equal, to reduce its thickness and volume, and especially to decrease the pressure drop it generates.

An active mass M consisting of a material having a large heat exchange surface is arranged in the remaining part of the crown outside this catalytic bed, between the separation plates 8. It can be ceramic or metal balls, turning or machining chips, a bulk or structured packing, a honeycomb structure with regular or irregular cells such as honeycombs, knitted, woven or needled metallic mats, etc. A honeycomb structure such as that described in the claimant's patent FR-2,564,037 is advantageously used. This mass exhibiting a large heat exchange surface can also consist of stones.

In order to facilitate manufacturing and loading, the crown can also be so arranged that it serves as a support for a certain number of parallelepipedic baskets 10 separate from one another, as shown in FIG. 1.

In the diametral plane containing the axis 3 of crown 1, the narrowness of the space remaining between the crown and cage 2, on account of its eccentricity and of wall projection 4, generates a pressure drop sufficient to prevent direct peripheral communications between the two upstream and downstream spaces Za and Zb other than through the central zone 11. Joints or flap joints 12 can be possibly placed on the periphery of the crown where the temperature is relatively low in order to complete the seal.

The crown and the cage are closed at their lower and upper parts by even plates 13. Several blade joints (not shown) simultaneously resting between the corresponding plates of the crown and of the cage prevent parasitic bypassing flows between zones Za and Zb.

Motive means (not shown) arranged above the cage for example are coupled with the shaft in the vertical axis 3 of the crown for driving it into rotation with respect to cage 2.

The intermediate angular sector delimited by the wall portion 4 of the cage preferably comprises a pipe 14 for injecting fresh air intended to blow off the foul effluents through the thermal mass and the catalyst in the few angular sectors of the crown passing before it, prior to each inversion of the direction of flow. After crossing the drained sectors, the sweep air mass reaches the central zone 11 where it is carried along with the main flow towards zone Zb through crown 1.

In the angular sector opposite pipe 14, the cage comprises another pipe 15 (FIG. 1) for injecting fresh air intended to regulate possibly the temperature of the catalytic reaction if it rises too much.

The reaction that takes place in the central zone is exothermic and it is adjusted so as to release enough energy to compensate substantially for the calorific dissipation. A proportion of 0.4 g of VOC per $m^3$ of effluents is enough for an autothermal running.

A burner (B) supplied with natural gas or LPG (liquid propane gas) is arranged above central zone 11 for example, its flame entering directly the central zone. It is used to heat the incoming flows at the starting point if necessary, so as to reach an autothermal working point, or possibly to provide makeup heat if the polluting compounds VOC content is insufficient to obtain an autothermal running.

According to the embodiment of FIG. 1, the temperature in the catalytic reactor is controlled separately by means of a burner B above the crown and of a radial pipe 15 delivering fresh effluents.

Figure 2:
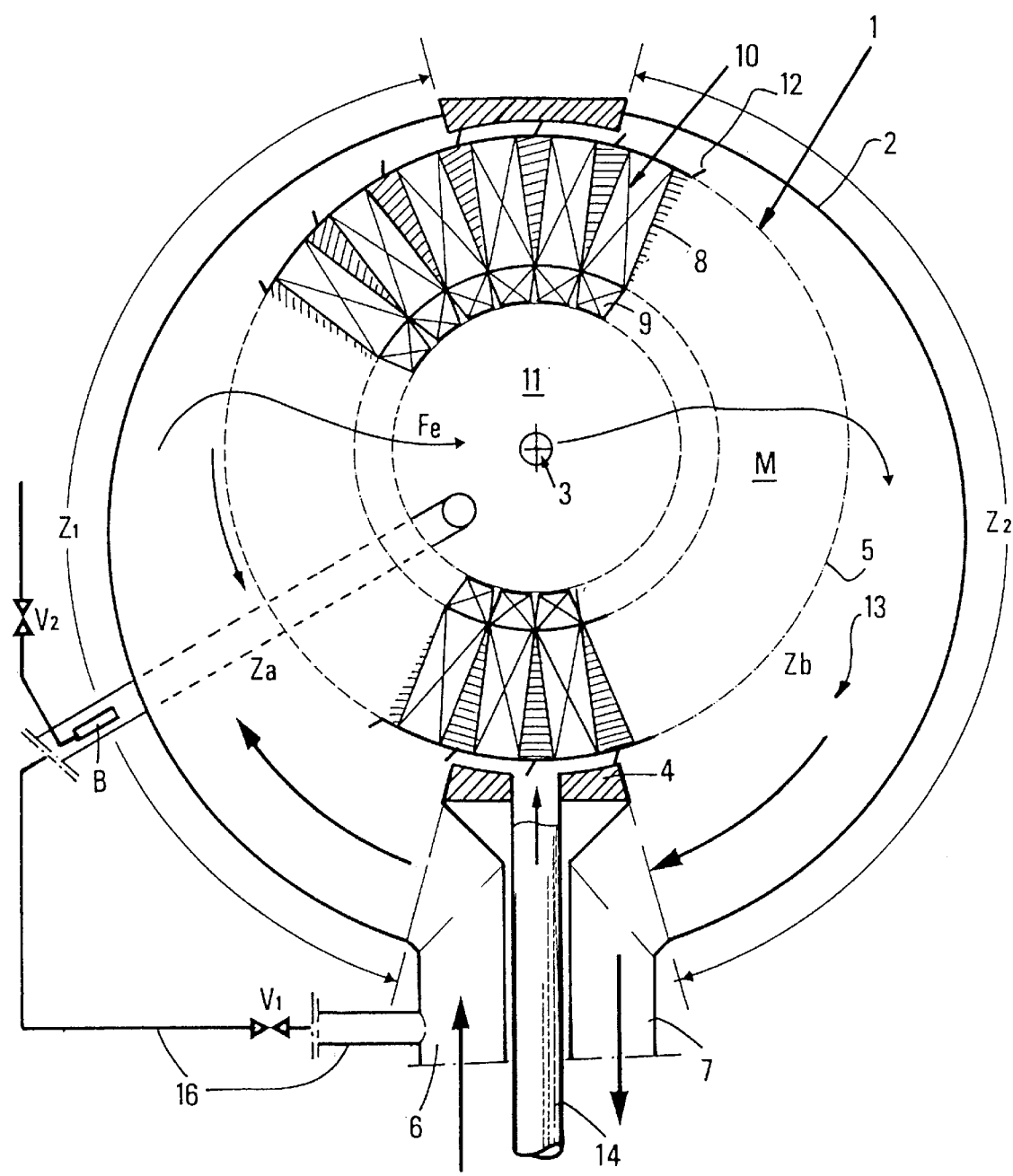
FIG. 2 shows an embodiment variant of the means for regulating the temperature of the catalytic reactor.

According to the embodiment of FIG. 2, burner B can be placed in a pipe 16 opening into central zone 11 instead of being placed directly above this zone. Pipe 16 can act as a bypass line connected to the pipe 6 delivering the effluents to be treated. The flow diverted through this pipe 16 is controlled by a valve V1. Burner B is supplied with fuel by means of a control valve V2. By varying the flow of effluents diverted through pipe 16 and its temperature by means of burner B, the exothermic reaction can be controlled in the reactor. If the polluting substances concentration exceeds the autothermal limit, cold effluents are injected. On the other hand, the burner is fed if this concentration remains below this limit and during the installation starting period.

After their double passage through the catalytic bed, on either side of central zone 11, the polluting compounds (VOC) are converted by the reaction into various combustion products: $CO_2$, $H_2O$, $N_2$ mainly, $SO_x$ and $NO_x$ as traces.

The high temperature gases coming from the reactive zone flow through the part of the load or active masses M located in the angular zone Z2 of the crown and they yield a good part of their calories thereto. The rotation of crown 1 with respect to cage 2 progressively brings the heated elements towards the angular zone Z1 where they can yield in turn part of the calorific energy stored to the gases flowing in through delivery pipe 6.

The layout of the embodiment described above, with its rotating crown provided with a catalytic bed and a heating load arranged concentrically allows, in relation to prior embodiments, to obtain a decrease in the global volume between 8% and 27% and in the weight of material between 6% and 32%, according to the hourly flow of effluents treated (between 3,000 $m^3$ and 130,000 $m^3$). Similarly, still according to the hourly flow, the volume of catalyst that can be loaded can be increased by 20 to 60%. These variations have a considerable effect on the costs.

Tests carried out for a pilot installation capable of treating 3,000 $m^3$/h of air polluted by xylene produced the results as follows:

heat efficiency . . . 95% limit rate allowing an autothermal catalytic oxidation . . . 0.6 g/$Nm^3$ cleaning efficiency . . . 99.2%

We claim:

1. A rotating catalytic cleaning device for cleaning polluted gaseous effluents, comprising a housing or cage, a crown containing a mass arranged within the cage and motive means for driving the crown into a continuous rotating motion about a vertical axis, at least one delivery pipe for feeding effluents into the cage and at least one discharge pipe for discharging effluents out of the cage, the crown comprising at least a first angular zone for communicating continually said at least one delivery pipe with a central zone of the cage, and at least a second angular zone of the crown for communicating continually the central zone of the cage with said at least one discharge pipe and a catalytic cleaning reactor for burning polluted gaseous effluents channelled by said first angular zone, wherein the catalytic cleaning reactor includes at least one annular catalytic bed arranged inside the crown and outside of the central zone, on the total circumference thereof, and rotating with the crown, and wherein said angular zones containing said mass are radially outside the annular catalytic bed.

2. A device as claimed in claim 1, wherein the crown is eccentric in the cage, the cage delimiting around the crown a first and a second angular zones of variable section, and two intermediate zones between said first and second angular zones of variable section being narrow enough so as to prevent parasitic flows from bypassing the catalytic reactor.

3. A device as claimed in claim 1, comprising insulating joints arranged between the cage and the crown.

4. A device as claimed in claim 1, wherein the mass is made of a material exhibiting a heat exchange surface and is located in the crown, outside the catalytic bed.

5. A device as claimed in claim 1, wherein the catalytic cleaning reactor comprises heating means communicating with the central zone of the crown.

6. A device as claimed in claim 5, wherein the heating means comprise a burner arranged above the central zone of crown.

7. A device as claimed in claim 1, wherein the angular zones of the crown are partitioned into angular portions by radial separation plates, each of said angular portions being filled with the mass which is made of a bulk load of a material exhibiting a heat exchange surface.

8. A device as claimed in claim 1, wherein the angular zones of the crown include a plurality of parallelepipedic chambers radially placed all around the crown outside the annular catalytic bed, said parallelepipedic chambers being filled with the mass which is made of a bulk load exhibiting a heat exchange surface.

9. A device as claimed in claim 1, wherein the crown and the cage each comprise an upper wall and a lower wall, and seal elements corresponding to and arranged between said upper and lower walls of said crown and cage.

10. A device as claimed in claim 2, further comprising first injecting means for injecting a flow of sweep gas into at least one of said two intermediate zones.

11. A device as claimed in claim 10, further comprising second injecting means in another one of said two intermediate zones for injecting a flow of fresh gas for regulating temperature.

12. A continuous cleaning process for cleaning, by catalytic incineration, flows of gaseous effluents polluted with polluting substances, comprising establishing a permanent circulation of effluents to be incinerated between delivery pipes and discharge pipes through a rotating crown, said crown being provided inside with a central zone and radial separation plates and containing at least an annular, rotating catalytic bed arranged outside the central zone of the crown, and a thermal mass of a material exhibiting a heat exchange surface being disposed between the radial separation plates and radially outside of said catalytic bed so that the effluents flow twice across the rotating catalytic bed on either side of the central zone of the crown, wherein said polluting substances are cleaned from said gaseous effluents.

13. A process as claimed in claim 12, wherein the crown comprises first and second heat exchange zones, and wherein each of said first and second heat exchange zones communicates with said delivery pipes and said discharge pipes, and wherein gaseous effluent flows heat up when in contact with the thermal mass in said first heat exchange zone and, after a double passage through the rotating catalytic bed, heats the thermal mass in said second heat exchange zone.

* * * * *